United States Patent

[11] 3,557,745

[72] Inventor Robert S. Harrah
 4108 Dupont, Houston, Tex. 77021
[21] Appl. No. 777,670
[22] Filed Nov. 21, 1968
[45] Patented Jan. 26, 1971

[54] INDICATOR DEVICE
 5 Claims, 4 Drawing Figs.

[52] U.S. Cl. ..................................................... 116/70,
 40/28, 40/326; 200/82
[51] Int. Cl. ..................................................... G01l 19/12
[50] Field of Search ............................................. 116/65, 70,
 135, 124, 129; 40/28, 331, 326; 184/6, 6C, 96, 97;
 200/82, 167; 235/201ME; 73/(Inquired), 146.8,
 388, 419

[56] References Cited
 UNITED STATES PATENTS

| | | | |
|---|---|---|---|
| 1,761,947 | 6/1930 | Wedin | 116/129UX |
| 3,237,591 | 3/1966 | Pichel | 116/124 |
| 3,357,638 | 12/1967 | Sher et al. | 235/201 |
| 3,368,751 | 2/1968 | Merrill | 235/201 |
| 3,372,501 | 3/1968 | Greene | 40/28 |
| 3,451,372 | 6/1969 | Grover | 116/114 |

FOREIGN PATENTS

| | | | |
|---|---|---|---|
| 28,321 | 1930 | Australia | 40/326 |
| 704,334 | 2/1965 | Canada | 116/70 |
| 917,582 | 9/1954 | Germany | 116/70 |

OTHER REFERENCES
 I. B. M. Technical Disclosure Bulletin Vol. No. 5 February 1959 OPTICAL MECHANICAL DISPLAY DEVICE J. R. Knight

*Primary Examiner*—Louis J. Capozi
*Attorney*—Donald Gunn

ABSTRACT: An indicating device providing a visual readout of an equipment malfunction or the like, the readout being visible during an alarm condition wherein the particular malfunction is indicated by appropriate written words or symbols carried on a movable elongate member having sufficient length to span the words or symbols representing the particular failure, wherein the elongate means moves into or away from the optical range of a lens which, when the elongate means is present, provides a readily visible and readable indication and which provides no indication when the elongate means is moved away from and beyond the range of visibility of said lens.

PATENTED JAN 26 1971

3,557,745

Robert S. Harrah
INVENTOR

BY Donald Gunn

ATTORNEY

INDICATOR DEVICE

SUMMARY OF PROBLEM AND INVENTION

In the equipment rooms of petroleum refineries, chemical processing plants and the like, a great number of gauges, chart recorders, and other indicators are maintained. It is difficult for the operator to visually encompass all of them, and moreover, they often present much data spread over a wide surface making it difficult to see and comprehend all on display. The practice has grown to utilize alarm indicators for a great number of variables. A wide range is often tolerated for a great number of physical functions on display. For example, the pressure of the lubricating oil in many systems is often not very important so long as the pressure stays within prescribed limits. However, should the pressure drop to zero, an alarm condition is indicated and the operator must respond quickly to it. Thus, the use of go-no-go indicators has materially increased. However, many problems exist with devices presently available. Some devices which compete with the present invention are exceedingly complicated mechanisms which are difficult to install, expensive, and sufficiently complicated to require more than nominal service. Moreover, the panel mounting area for each indicator is excessive and as the mounting area increases, the back panel plumbing and interconnections likewise increase. The present invention is a device which overcomes the failures of the prior art and is summarized as including a window or lens extending over the unit or multiple units as needed, there being a written message or symbol immediately therebehind to alert the operator as to the precise function which has reached its alarm limits. The apparatus preferably includes an elongate plunger or piston which has suitable span to encompass the words or symblos informing the operator. A lens faces the operator and provides access for a printed transparency which is removable or interchangeable on which the alarm name or symbol is printed. The transparency is inserted behind the lens, when needed, and is easily changed when the function is changed. The elongate plunger is carried in a set of guides preferably at the left and right-hand sides of the apparatus, the guides supporting the plunger as it moves forwardly toward the lens or away from the lens. The plunger has a face which is exposed to the lens and which is preferably marked with an iridescent paint or suitable background coloring to provide a contrasting view through the lens of the message printed on the transparency. The plunger is arranged with respect to the lens so as to disappear from view when moved far from the lens and to come into view when moved forwardly toward the transparency and the lens. The view seen by the operator is a go-no-go symbolization in which the lens appears typically dark or is fully printed and illuminated, depending on the position of the plunger. The elongate plunger is moved by suitable means not pertinent to the present invention.

Many objects and advantages of the present invention will become more readily apparent from a consideration of the included specification and drawings, wherein.

Figure 1:
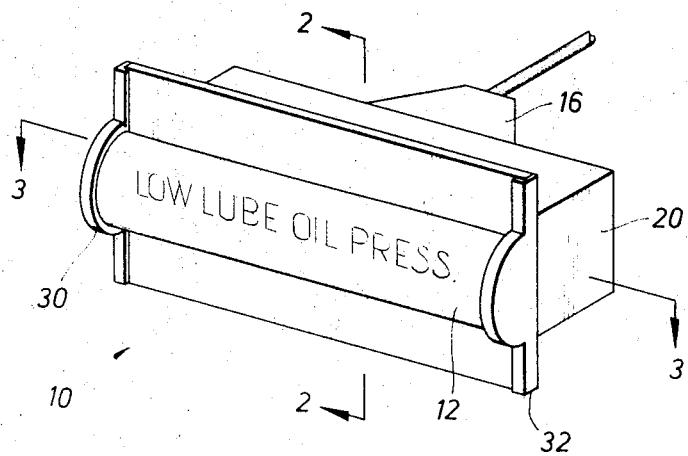
FIG. 1 is a perspective view of a single indicator in accordance with the present invention.

Attention is first directed to FIG. 1. The alarm indicator is indicated by the numeral 10 and incorporates a front viewing lens 12 mounted on a suitable support 14 which positions a slidable plunger 16 with respect to the lens 12. The plunger 16 is moved forward or rearwardly with respect to the lens 12 to bring forth the illuminated warning signal, one of which is represented in the drawings. It will be understood and recognized that the present invention is usable with warning signals of any nature or character. For instance, symbols may be used exclusively. The wording may be varied in any form or fashion desired.

Considering the present invention more in detail, the warning device 10 is comprised of a basic framework 14 which is adapted to be mounted on an instrument panel. The framework 14 incorporates a pair of end plates indicated by the numerals 18 and 20 in FIG. 3 which capture the plunger 16 within a channelway. An upper plate 22 is spaced from a lower plate 24 and both extend backwardly between the end plates 18 and 20 to guide the plunger 16 as it moves forwardly and rearwardly. As will be appreciated, the guides need not be exceedingly tight, but are somewhat loose to thereby permit the plunger 16 to move to and fro somewhat easily.

The plunger 16 is connected to a transducer, the configuration of which is beyond the scope of the present disclosure. The transducer may be a set of bellows, a Bourdon tube, piston and cylinder arrangement, solenoid, and so on. The mode of operation of the transducer is likewise not material. The significant fact is that a stroke of a predetermined length is applied to the plunger 16 to reciprocate it to and fro with respect to the lens 12.

Figure 2:
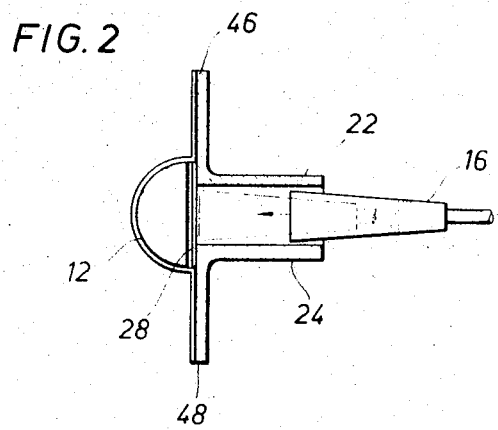
FIG. 2 is a sectional view taken along the line 2–2 showing the elongate plunger moving with respect to the lens to provide an indication therethrough.

The sectional view of FIG. 2 illustrates the lens 12 positioned forwardly of a transparency 28 which passes light from the plunger 16 through the lens 12. The transparency is trapped behind the lens 12 to position appropriate words or symbols for viewing by the operator. For instance, in FIG. 1, the alarm message is "low lube oil press." Obviously, other words or symbols may be used with the present invention. The apparatus utilizes the removable transparency 28 to change warnings or symbols as needed.

Figure 3:
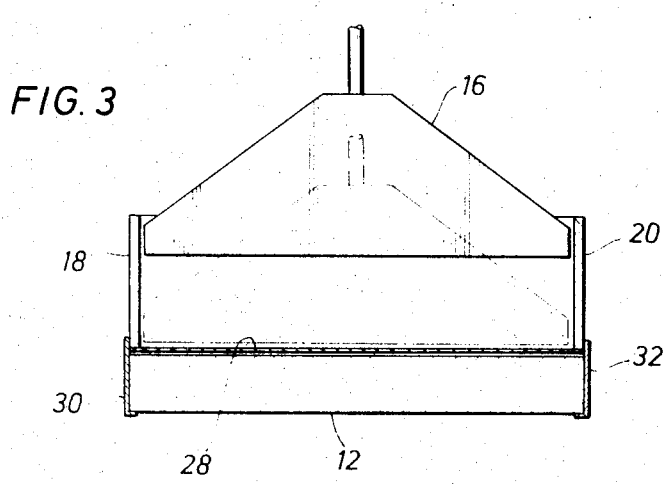
FIG. 3 is a sectional view taken along the line 3–3 of FIG. 1 illustrating additional details of construction of the present invention; and, FIG. 4 shows several of the devices shown in FIG. 1 which are nested together to provide a great number of indications on a relatively small panel area.

In FIGS. 2 and 3, the plunger 16 is shown in full line at a recessed or withdrawn position. Also, the dotted line representation illustrates the forward or advanced position at which a warning is created by the present indicator 10. In the recessed position, the plunger is withdrawn to such an extend that the view through the lens 12 is unintelligible. The particular lens illustrated is a semicircular plastic rod which extends the full width of the apparatus. To use the full span of the plunger 16, the curvature is consistent from one end to the other. The lens 12 has a uniform focal length along its full width which focuses the plunger 16 uniformly across the face of the apparatus when it moves past the critical point. The critical point need not be sharply defined, but it is at a midpoint between the two positions of the plunger 16. Thus, when it is withdrawn, it is far beyond viewing through the lens 12, and when the plunger 16 is advanced, the alarm indication given through the lens 12 is clear and sharply defined.

The lens 12 is supported in position by mounting brackets 30 and 32 on opposite ends of the apparatus. The brackets 30 and 32 are preferably symmetrical and incorporate a small lip which encases the lens 12 to secure it in the position illustrated.

Attention is next directed to FIG. 3 of the drawings. In FIG. 3, the lens 12 is shown enclosed between the end pieces 30 and 32. The transparency 28 is clamped by the lens 12 to the desired position.

The method of assembly and joinder of the various components of the present invention may vary widely. For instance, the means 30 and 32 hold and secure the lens 12 in position as illustrated in FIG. 3. Clearly, an alternative embodiment may be used wherein the lens is joined directly to the framework of the present apparatus. The guides and end walls for the plunger 16 may be integrally formed as shown in the drawings, or may be formed of separate pieces and joined together by welding or the like. The upper and lower flanges for mounting the apparatus in a panel may include tapped holes which have been omitted for sake of clarity.

Figure 4:
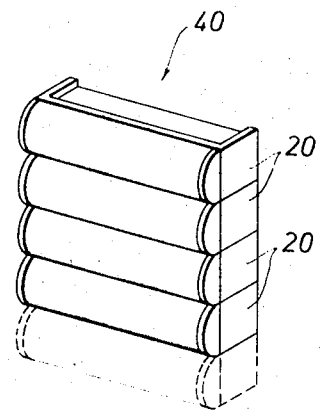

Attention is momentarily directed to FIG. 4 of the drawings which shows the embodiment 10 nested or grouped in a cluster of indicating means 40. The number is subject to increase without particular limitation. The end walls 18 and 20 of the uppermost indicator 10 are either joined or integrally formed with the end walls 18 and 20 of the indicator therebelow. Further, the capping means 32 which secures the lens 12 in position is formed in a greater length as shown in FIG. 4 to hold the several lenses as shown in the drawings. Through the use of such means, the indicator device of the present invention is nested to provide a large number of indications in a relatively small surface area on a panel.

The flanges are suitably adapted to be abutted against a panel surface and both are easily drilled or tapped to secure the indicator device 10 to the panel. Sometimes, the installation of a single indicator 10 requires projecting ears or the like extending adjacent to or immediately behind the panel to receive the mounting screws.

Should it be desired to place the indicating device 10 in a small slot opening, the upper flange portion 46 and the lower flange portion 48 of the face of the apparatus 10 may be omitted. This will then decrease the total height of the apparatus. Consequently, the apparatus may be easily slipped into a rectangular slot of sufficient width to receive the rectangular structure. It is of no consequence whether the lens 12 is of greater width than the channels since it is not usually recessed into the panel in which the indicator means 10 is mounted.

For providing a relatively tight grouping of the indicator devices 10, such as that shown in FIG. 4, the flanges 46 and 48 are omitted to permit several units to be installed in a slot cut in a panel. The multiple unit 40 shown in FIG. 4 is adapted to nest the single indicators 10 one against the other in a manner which presents all the needed information to the operator within easy view and not spread about the panel. The guides or channels for each plunger and the various indicators may be integrally formed one above the other as desired.

Many variations and alterations can be incorporated in the embodiment disclosed. However, the present invention is defined by the claims appended hereto.

I claim:
1. An indicating device comprising: a case having an elongated passageway therein and terminating at an opening in the forward end thereof; a lens mounted in relation to said case across said opening and operatively arranged to position the focal point of said lens at an intermediate location in said passageway; a movable member operatively arranged in said passageway and adapted for movement back and forth therein between a withdrawn position where the forward face of said movable member is to the rear of said focal point and an advanced position where the forward face of said movable member is between the rearward surface of said lens and said focal point; a transparent sheet bearing one or more colored symbols thereon positioned between the rearward surface of said lens and said opening and adapted for viewing by an observer looking through the forward surface of said lens and into said passageway toward said focal point; and means on said forward face defining an iridescent coloration contrasting with said colored symbols and selectively adapted for emphasizing said colored symbols when said movable member is in its said advanced position ahead of said focal point and for obscuring said colored symbols when said movable member is in its said withdrawn position to the rear of said focal point.

2. The indicating device of claim 1 further including means adapted for detachably mounting said transparent sheet adjacent to the rearward surface of said lens.

3. The indicating device of claim 1 wherein said opening, said passageway, and the forward face of said member are respectively of a generally rectangular configuration; and said lens is an elongated member extending across said opening and having a convex forward face.

4. The indicating device of claim 3 wherein said transparent sheet is a generally rectangular strip; and further including means adapted for detachably mounting said strip along the rearward surface of said lens.

5. The indicating device of claim 4 wherein the rearward surface of said lens is substantially flat.